United States Patent Office 3,242,074
Patented Mar. 22, 1966

3,242,074
FIBER TREATING COMPOSITIONS AND
FIBERS TREATED THEREWITH
Raymond E. Donaldson and Charles C. White, Kingsport, Tenn., assignors to Eastman Kodak Company, Rochester, N.Y., a corporation of New Jersey
No Drawing. Filed Mar. 22, 1963, Ser. No. 267,313
15 Claims. (Cl. 252—8.75)

This invention relates to novel compositions of matter for use in the textile art.

This invention is directed to novel fiber treating compositions for application to fibers, filaments, and the like prepared from hydrophobic resins such as polyester resins, polyacrylic resins, modified polyacrylic resins, polyamide resins, polyolefin resins, polyurethane resins, and cellulosic resins.

Fibers, filaments, tow, and yarn treated in accordance with this invention have highly satisfactory antistatic properties and highly satisfactory frictional characteristics. Hydrophobic fibers treated in accordance with this invention can be associated with or blended with hydrophilic fibers such as cotton fibers, wool fibers, silk fibers, viscose fibers, and the like without any substantial migration of the applied composition to the hydrophilic fibers.

In accordance with this invention there is provided a novel fiber treating composition which results from combining the following materials or components in the amounts designated, which amounts are by weight:

(1) White mineral oil having a viscosity of from about 30 to 125 Saybolt Universal Seconds (S.U.S.) at 100° F., from about 3 parts to 50 parts, (2) Paraffin wax (preferably refined paraffin wax), from about 1 part to 50 parts, (3) At least one partial ester of lauryl alcohol and phosphoric acid, from about 5 parts to 35 parts, (4) A compound selected from the group consisting of N,N-diethylaminoethanol, morpholine and mixtures thereof, from about 1 part to 10 parts, (5) Diethanolamine, from about 1 part to 10 parts, (6) Oleyl alcohol, from about 1 part to 10 parts, (7) o-Phenylphenol, from about 1 part to 8 parts, (8) Polyoxyethylene derivative of castor oil, from about 3 parts to 15 parts, (9) Sorbitan monopalmitate, from about 3 parts to 15 parts,

(10) Sorbitan monolaurate polyoxyethylene ether, from about 1 part to 8 parts,

(11) N,N-diethylaminoethanol salt of oleyl acid sulfate, from about 2 parts to 20 parts,

(12) Oleic acid, from about 1 part to 10 parts.

The partial ester of lauryl alcohol and phosphoric acid component of the composition of this invention can be either monolauryl phosphate $(C_{12}H_{25})H_2PO_4$, dilauryl phosphate $(C_{12}H_{25})_2HPO_4$, or mixtures thereof. Mixtures of monolauryl phosphate and dilauryl phosphate are preferred as they are available commercially. Mixtures comprised of monolauryl phosphate and dilauryl phosphate in substantially equimolar proportions have proved highly satisfactory when employed in carrying out this invention.

Morpholine reacts with partial esters of lauryl alcohol and phosphoric acid to provide a salt as follows:

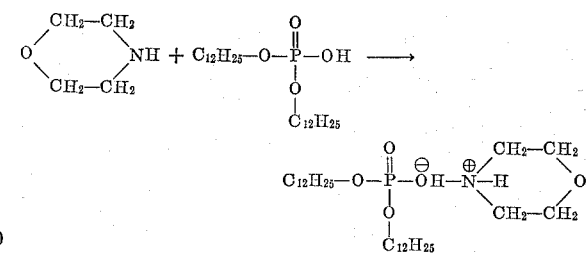

N,N-diethylaminoethanol reacts in a similar manner with the partial esters of phosphoric acid and lauryl alcohol to form a salt.

Thus, the morpholine or the N,N-diethylaminoethanol component and the partial ester of lauryl alcohol and phosphoric acid component can be incorporated into the composition of this invention separately or the salt thereof can be first prepared and subsequently admixed with the other components.

The polyoxyethylene derivative of castor oil component is a water-dispersible derivative wherein the polyoxyethylene group has an average molecular weight of from about 1000 to about 9000.

The sorbitan monolaurate polyoxyethylene ether component is derived by reacting sorbitan monolaurate with a preformed polyethylene glycol of desired molecular weight or with from 10 to 30 mols of ethylene oxide. Such reaction products are known in the art and are sometimes referred to as, for example, "reaction products of sorbitan monolaurate with 20 mols of ethylene oxide." The average molecular weight of the polyoxyethyene group will usually be of the order of about 400 to about 1400. This compound can also be defined as a polyoxyethylene derivative of sorbitan monolaurate wherein the polyoxyethylene group has an average molecular weight of from about 400 to 1400.

The N,N-diethylaminoethanol salt of oleyl sulfate can be represented by the structural formula

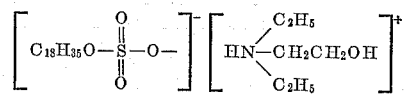

The lubricating composition of this invention is applied preferably as an emulsion from an aqueous medium. Preparation of an aqueous emulsion or dispersion is accomplished by blending together all components, except the diethanolamine component, in the desired amount. Heat is applied during blending to melt such components as the paraffin wax, the polyoxyethylene derivative of castor oil, and the o-phenyl phenol. Temperatures of the order of about 50° C. have proved satisfactory for this purpose. The blended components are added, with constant stirring, to the desired amount of water. After this is accomplished, the diethanolamine component, in the desired amount, is added with constant stirring. An aqueous emulsion is prepared that is substantially stable for prolonged periods of time and can be easily and readily applied to fibers by known methods.

A small amount, of the order of from about 3% to 6% by weight, based on the total weight of the composition, of a solvent can be incorporated into the aqueous emulsion to assist in preparing a substantially homogeneous emulsion that is stable for prolonged periods of time. The solvent is preferably admixed with all components, except the diethanolamine component, followed by addition of the mixture or blend to water. The diethanolamine component is subsequently added. A hydrocarbon solvent such as a mixture of petroleum naphthas has proved satisfactory for this purpose. A particularly suitable mixture of petroleum naphthas is that available commercially under the proprietary designation Varsol. The solvent, together with the water vehicle, is substantially all removed from the applied coating by heating the treated fibers, temperatures of the order of from about 100° C. to 150° C. have proved satisfactory.

The lubricating and antistatic composition of this invention can be applied to textile fibers in any conventional manner such, for example, as by immersion, by wick application, by roll application or by spraying.

When water is employed as a vehicle or carrier for the composition of this invention, the aqueous emulsion or dispersion will usually comprise, by weight, from about 5 parts to 25 parts of the composition and from about 95 parts to 75 parts of water. Distilled water is preferred. The above portions are not critical and can be departed from if desired. The proportions set forth above have proved highly satisfactory in use.

In applying a novel composition of this invention to hydrophobic textile fibers, it has been determined, by long experience, that the amount of composition carried by a fiber, filament, or yarn lies within a relatively narrow optimum range. Below the range, insufficient lubrication and antistatic properties are obtained, above the range, certain properties such as tensile strength and processability are affected adversely. The amount of antistatic and lubricating composition carried by the fibers can be within the range of from about 0.1% to 3% by weight based on the weight of the fibers. It is preferred, however, that the applied antistatic and lubricating compositions be within the relatively narrow range of from about 0.1% to 1% by weight based on the weight of the fiber.

The following examples are illustrative of this invention. All parts are by weight unless otherwise indicated.

EXAMPLE I

Fibers prepared from polyethylene terephthalate are treated by applying thereto about 0.15% by weight, based on the weight of the fibers of a composition resulting from the combination of the following components.

| Component: | Parts by wt. |
| --- | --- |
| White mineral oil (50 S.U.S. at 100° F.) | 23.7 |
| Paraffin wax | 13.3 |
| Blend of monolauryl phosphate and dilauryl phosphate (substantially equal molar proportions) | 13.3 |
| Morpholine | 7.6 |
| Oleyl alcohol | 3.8 |
| Ortho-phenylphenol | 3.0 |
| Sorbitan monopalmitate | 8.0 |
| Polyoxyethylene derivative of castor oil wherein the polyoxyethylene group has a molecular weight of about 8400 | 5.3 |
| Reaction product of sorbitan monolaurate with 20 mols of ethylene oxide | 3.8 |
| N,N-diethylaminoethanol salt of oleyl acid sulfate | 8.5 |
| Oleic acid | 4.7 |
| Diethanolamine | 5.0 |

The above components are combined as hereinbefore described and applied as an aqueous emulsion, about 90% by weight of which is water, to the polyethylene terephthalate fibers by spraying. The treated fibers are subsequently heated to remove therefrom substantially all water. The treated fibers are processed as cut staple on cotton processing textile equipment, and they perform excellently in carding, drawing, and spinning to give an improved polyethylene terephthalate yarn. No static is encountered on the fibers during processing and improved processing efficiency is obtained for all stages of processing.

EXAMPLE II

The aqueous dispersion of Example I is applied in the same manner as in Example I to cut staple fibers prepared from poly-1,4-cyclohexylenedimethylene terephthalate to provide thereon about 0.24% by weight, based on the weight of the fibers, of the fiber treating composition. These fibers are subsequently blended with viscose fibers in picking, which is the first step in preparing staple fibers for processing. The blend of viscose rayon and the above polyester fiber is aged for about 7 days before further processing. The blend is then processed through carding, drawing, and spinning, and is found to possess excellent processing properties with substantially no difficulties due to static charge buildup on the fibers.

EXAMPLE III

A fiber treating composition is prepared by combining the following components in the manner hereinabove described to provide an aqueous dispersion or emulsion thereof comprised of by weight, about 90 parts of distilled water and about 10 parts of the fiber treating composition.

| Component: | Parts by wt. |
| --- | --- |
| White mineral oil (50 S.U.S. at 100° F.) | 10 |
| Paraffin wax | 10 |
| Blend of monolauryl phosphate and dilauryl phosphate (substantially equal molar proportions) | 19 |
| N,N-diethylaminoethanol | 9 |
| Oleyl alcohol | 4 |
| Ortho-phenylphenol | 3 |
| Sorbitan monopalmitate | 9.6 |
| Polyoxyethylene derivative of castor oil wherein the polyoxyethylene group has a molecular weight of about 8400 | 6.4 |
| Reaction product of sorbitan monolaurate with 20 mols of ethylene oxide | 3.8 |
| N,N-diethylaminoethanol salt of oleyl acid sulfate | 10 |
| Oleic acid | 5 |
| Diethanolamine | 5 |
| Mixture of petroleum naphthas (Varsol) | 4 |

The aqueous dispersion is applied to 1½ inch cut staple polyethylene terephthalate fibers in an amount to provide thereon, after water and petroleum naphtha removal, about 0.20%, by weight, of fiber treating composition based on the weight of the fibers. Application is made by spraying the aqueous dispersion on the fibers. These lubricated fibers are processed on standard cotton textile equipment through picking, carding, drawing, and spinning, and these fibers perform excellently to give a spun yarn having improved properties. The treated fibers exhibit no trouble from static in any of the processing steps, do not load the card cylinder, and do not wrap rolls in spinning or drawing.

EXAMPLE IV

Nylon-6 fibers are treated in accordance with the procedure of Example I using the fiber treating composition of Example I with satisfactory results.

EXAMPLE V

Polyethylene fibers are treated with the composition of Example III in substantially the same manner of Example III with satisfactory results.

EXAMPLE VI

Cellulose acetate fibers are treated in accordance with both Examples I and III to provide treated fibers having highly satisfactory antistatic properties. The treated fibers are easily and readily processed on standard cotton textile equipment.

The novel antistatic and lubricating compositions of this invention are adapted particularly for the treatment of synthetic resinous fibers prepared from polyester resins such as polyethylene terephthalate and poly 1,4-cyclohexylenedimethylene terephthalate; polyamide resins such as polycaprolactam (nylon-6), polyhexamethylene adipamide (nylon-66) and polyhexamethylene sebacamide (nylon-610); polyolefins such, for example, as polyethylene, polypropylene, and poly-1-butene; and polyacrylates.

Other textile fibers, filaments, yarns and the like that can be treated with the antistatic and lubricating composition of this invention include those prepared from the organic acid esters of cellulose such, for example, as cellulose acetate, cellulose triacetate, cellulose acetate butyrate, and cellulose acetate propionate.

Fibers, filaments, yarns and the like treated with the novel antistatic and lubricating composition of this invention are provided with substantial antistatic protection for prolonged periods of time. A buildup of electrostatic charges on the treated fibers is substantially eliminated.

One of the primary advantages of the novel composition of this invention is that it does not migrate to hydrophilic fibers when hydrophobic fibers, treated therewith are blended with or associated with hydrophilic fibers during textile processing steps. Hence, substantial continued control of static and frictional properties during subsequent textile processing operations is provided.

The compositions of this invention provide for highly satisfactory fiber to fiber, and fiber to metal frictional properties of the treated fibers during processing and the like. They do not corrode textile equipment and have no toxic effects. Furthermore, the novel lubricating and antistatic compositions of this invention, when applied to hydrophobic fibers of the type described hereinabove, provide treated fibers that have excellent tow opening properties. In addition, the fibers treated with the composition of this invention do not become sticky or gummy on aging, and they show excellent heat and light stability.

It is to be understood that the above description and examples are illustrative of this invention and not in limitation thereof.

We claim:
1. A fiber treating composition resulting from the combination of, by weight,
   (1) from about 3 parts to 50 parts of white mineral oil having a viscosity of from about 30 to 125 Saybolt Universal Seconds at 100° F.,
   (2) from about 1 part to 50 parts of paraffin wax,
   (3) from about 5 parts to 35 parts of a compound selected from the group consisting of monolauryl phosphate, dilauryl phosphate, and mixtures thereof,
   (4) from about 1 part to 10 parts of a compound selected from the group consisting of N,N-diethylaminoethanol, morpholine, and mixtures thereof,
   (5) from about 1 part to 10 parts of diethanolamine,
   (6) from about 1 part to 10 parts of oleyl alcohol,
   (7) from about 1 part to 8 parts of o-phenylphenol,
   (8) from about 3 parts to 15 parts of a water-dispersible polyoxyethylene derivative of castor oil wherein the polyoxyethylene group has an average molecular weight of from about 1000 to about 9000,
   (9) from about 3 parts to 15 parts of sorbitan monopalmitate,
   (10) from about 1 part to 8 parts of sorbitan monolaurate polyoxyethylene ether wherein the polyoxyethylene group has an average molecular weight of from about 400 to 1400,
   (11) from about 2 parts to 20 parts of N,N-diethylaminoethanol salt of oleyl acid sulfate, and
   (12) from about 1 part to 10 parts of oleic acid.
2. A fiber treating composition resulting from the combination of, by weight,
   (1) about 23.7 parts of white mineral oil having a viscosity of about 50 Saybolt Universal Seconds at 100° F.,
   (2) about 13.3 parts of paraffin wax,
   (3) about 13.3 parts of a blend of monolauryl phosphate and dilauryl phosphate,
   (4) about 7.6 parts of morpholine
   (5) about 3.8 parts of oleyl alcohol
   (6) about 3 parts of o-phenyl phenol
   (7) about 8 parts of sorbitan monopalmitate
   (8) about 5.3 parts of a polyoxyethylene derivative of castor oil wherein the polyoxyethylene group has an average molecular weight of from about 1000 to 9000
   (9) about 3.8 parts of a polyoxyethylene derivative of sorbitan monolaurate wherein the polyoxyethylene group has an average molecular weight of from about 400 to 1400,
   (10) about 8.5 parts of N,N-diethylaminoethanol salt of oleyl acid sulfate,
   (11) about 4.7 parts of oleic acid, and
   (12) about 5.0 parts of diethanolamine.
3. A fiber treating composition resulting from the combination of, by weight,
   (1) about 10 parts of white mineral oil having a viscosity of about 50 Saybolt Universal Seconds at 100° F.,
   (2) about 10 parts of paraffin wax,
   (3) about 19 parts of a blend of monolauryl phosphate and dilauryl phosphate,
   (4) about 9 parts of N,N-diethylaminoethanol,
   (5) about 4 parts of oleyl alcohol,
   (6) about 3 parts of o-phenylphenol,
   (7) about 9.6 parts of sorbitan monopalmitate,
   (8) about 6.4 parts of a polyoxyethylene derivative of castor oil wherein the polyoxyethylene group has an average molecular weight of from about 1000 to 9000,
   (9) about 3.8 parts of a polyoxyethylene derivative of sorbitan monolaurate wherein the polyoxyethylene group has an average molecular weight of from about 400 to 1400,
   (10) about 10 parts of N,N-diethylaminoethanol salt of oleyl acid sulfate,
   (11) about 5 parts of oleic acid, and
   (12) about 5 parts of diethylanolamine.
4. An aqueous dispersion of the fiber treating composition of claim 1 comprising 75–95 parts by weight water and 5–25 parts by weight fiber treating composition.
5. An aqueous dispersion of the fiber treating composition of claim 2 comprising 75–95 parts by weight water and 5–25 parts by weight fiber treating composition.
6. An aqueous dispersion of the fiber treating composition of claim 3 comprising 75–95 parts by weight water and 5–25 parts by weight fiber treating composition.
7. A textile fiber carrying on the surface thereof from about 0.1% to 3% by weight, based on the weight of the fiber, of the composition of claim 1.
8. A textile fiber carrying on the surface thereof from about 0.1% to 3% by weight, based on the weight of the fiber, of the composition of claim 2.
9. A textile fiber carrying on the surface thereof from about 0.1% to 3% by weight, based on the weight of the fiber, of the composition of claim 3.
10. A polyester fiber carrying on the surface thereof from about 0.1% to 3% by weight, based on the weight of the fiber, of the composition of claim 1.
11. A polyester fiber carrying on the surface thereof from about 0.1% to 3% by weight, based on the weight of the fiber, of the composition of claim 2.
12. A polyester fiber carrying on the surface thereof from about 0.1% to 3% by weight, based on the weight of the fiber, of the composition of claim 3.
13. A fiber prepared from a polyester resin selected from the group consisting of polyethylene terephthalate and poly - 1,4 - cyclohexylenedimethylene terephthalate carrying on the surface thereof from about 0.1% to 3% by weight, based on the weight of the fiber, of the composition of claim 1.

14. A fiber prepared from a polyester resin selected from the group consisting of polyethylene terephthalate and poly-1,4-cyclohexylenedimethylene terephthalate carrying on the surface thereof from about 0.1% to 3% by weight, based on the weight of the fiber, of the composition of claim 2.

15. A fiber prepared from a polyester resin selected from the group consisting of polyethylene terephthalate and poly-1,4-cyclohexylenedimethylene terephthalate carrying on the surface thereof from about 0.1% to 3% by weight, based on the weight of the fiber, of the composition of claim 3.

References Cited by the Examiner
UNITED STATES PATENTS

| | | | |
|---|---|---|---|
| 2,565,403 | 8/1951 | Sproule et al. | 252—8.9 XR |
| 2,614,984 | 10/1952 | Thomas et al. | 252—7.75 XR |
| 2,676,924 | 4/1954 | Fortess et al. | 252—8.8 |
| 2,743,193 | 4/1956 | Donaldson et al. | 252—8.8 XR |
| 2,759,851 | 8/1956 | Fluck et al. | 252—8.6 XR |
| 2,803,565 | 8/1957 | Sagar | 252—8.9 XR |
| 2,810,694 | 10/1957 | McLean et al. | 252—8.8 |
| 2,865,855 | 12/1958 | Chandler | 252—8.9 |
| 3,048,539 | 8/1962 | Kocay et al. | 252—8.8 |

JULIUS GREENWALD, *Primary Examiner.*